May 29, 1962

R. F. MARTINEK ET AL 3,036,380

ORTHODONTIC APPLIANCE

Filed Nov. 19, 1958

INVENTORS
RUDOLPH F MARTINEK
AND
PAUL MEYER

BY

Mock & Blum

ATTORNEYS

May 29, 1962   R. F. MARTINEK ET AL   3,036,380
ORTHODONTIC APPLIANCE
Filed Nov. 19, 1958   2 Sheets-Sheet 2
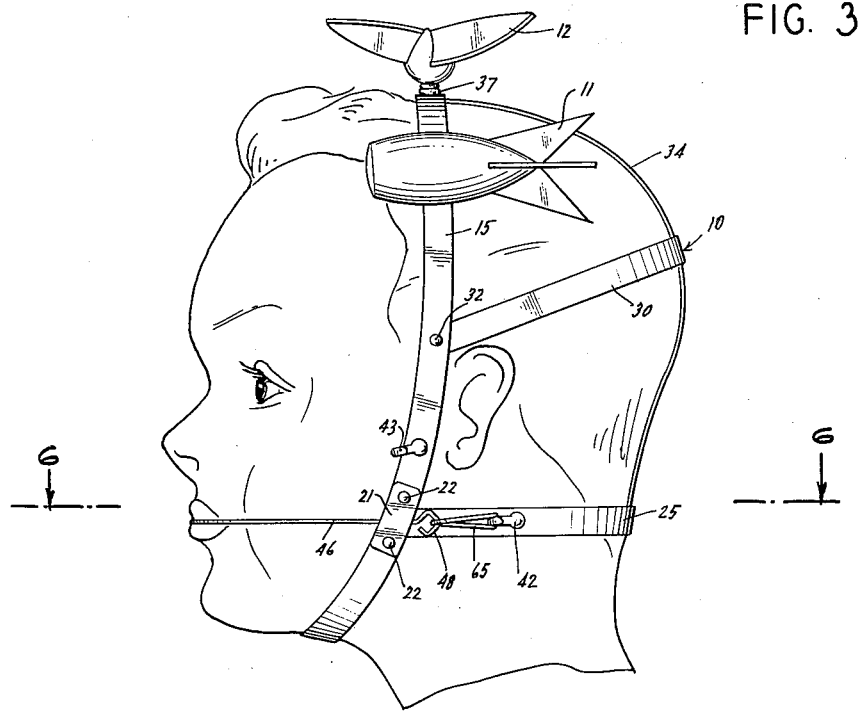
FIG. 3.
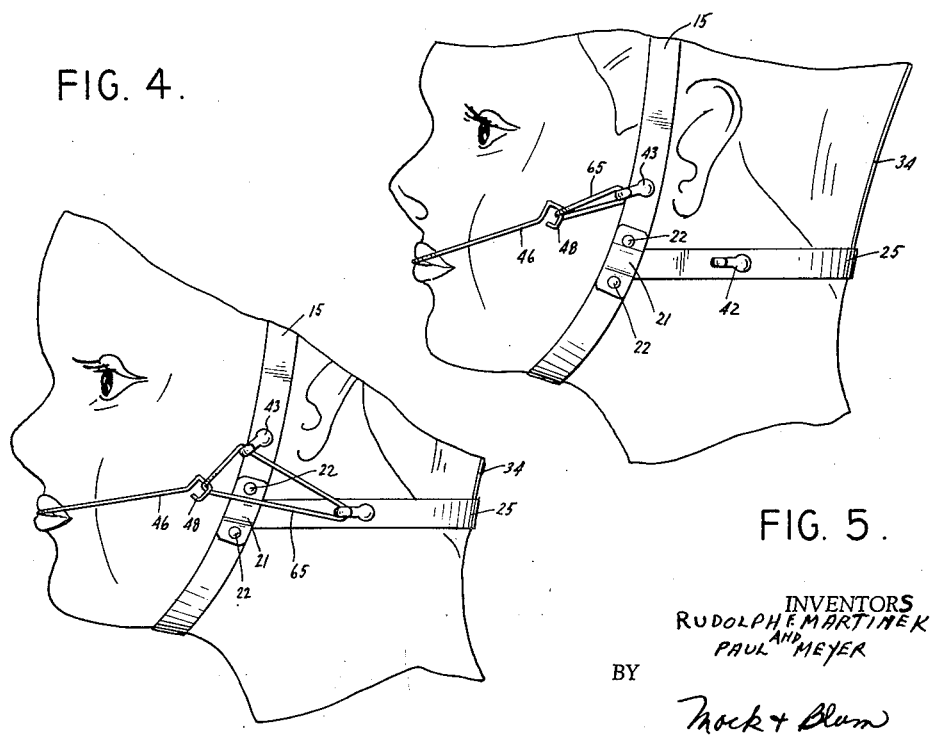
FIG. 4.
FIG. 5.
INVENTORS
RUDOLPH E MARTINEK
AND
PAUL MEYER
BY
Mock & Blum
ATTORNEYS 3,036,380
Patented May 29, 1962

1

3,036,380
ORTHODONTIC APPLIANCE
Rudolph F. Martinek, 7 Steamboat Road, Great Neck, N.Y., and Paul Meyer, Queens Blvd. and 48th St., Long Island City, N.Y.
Filed Nov. 19, 1958, Ser. No. 774,940
6 Claims. (Cl. 32—14)

This invention relates generally to dental appliances, and is especially concerned with such appliances as are used in the correction of children's malposed teeth. The invention also contemplates the provision of a combination dental appliance and toy.

As is well known to those versed in the art, growing children often require corrective orthodentic treatment for protruding or buck teeth. For effectiveness, such treatment should be applied frequently over substantial periods of time, and may usually be applied by the child himself, at home, with the proper instrumentality. However, the application of such treatment by conventional devices is onerous and uncomfortable, and therefore often a neglected task.

It is one object of the present invention to provide a dental appliance of the type described which is simple and easy to use, highly effective in its operative results, and which is uniquely attractive to children so as to stimulate use thereby.

A more particular object of the present invention resides in the provision of novel means for sustaining attractiveness of the instant device by permitting change thereof when desired.

It is a further object of the present invention to provide a dental orthodontic appliance having the advantageous characteristics mentioned in the preceding paragraphs which is extremely simple in construction and operation, durable and reliable in use, which can be economically manufactured for sale at a reasonable price, and in various head sizes.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIG. 3 is a side elevational view showing the head gear and orthodontic device of FIGS. 1 and 2 in assembled relation and operative condition on the head of a user in direct traction of the teeth;

FIG. 4 is a partial side elevational view similar to FIG. 3, but showing a slightly different condition of use in upward traction of the teeth;

FIG. 5 is a partial side elevational view similar to FIGS. 3 and 4, but showing still another condition of use in downward traction of the teeth;

Figure 1:
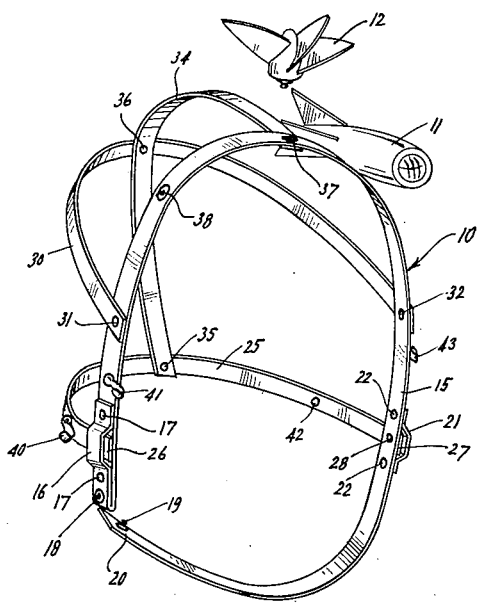
FIG. 1 is a perspective view showing a head gear construction of the present invention, and toy devices associated therewith.

Referring now more particularly to the drawings, and specifically to FIG. 1 thereof, there is illustrated therein a head gear, generally designated 10, and toy devices 11 and 12 removably and replaceably carried on the head

2 gear. The head gear includes an elongate band or strip 15, preferably fabricated of flexible plastic material and adapted to extend in a generally vertical plane about the user's head, beneath the chin and over the top of the head, as best seen in FIG. 3.

Referring again to FIG. 1, the strip or band 15 may have one end portion 16 turned or doubled back over the adjacent strip portion and secured in facing engagement with the outer surface thereof by suitable fasteners 17. Further, the region of the doubled over portion 16 between the fasteners 17 is spaced from the adjacent facing strip portion to define a loop. At one distal end of the band 15, adjacent to the bend or fold of the turned-back loop portion 16, is a fastener element 18, which may be of the snap type. A mating fastener element 19 is provided on the other distal end region 20 of the band 15, for detachable securement to the fastener element 18 to close and open the band 15. The loop 16 of the band 15 is adapted to be located on one side of the wearer's head, substantially horizontally rearward with respect to the wearer's mouth, as may be observed from FIG. 6.

Secured to the outer surface of the band 15 at a location spaced from the loop 16 so as to be located on the opposite side of the wearer's head and in substantial horizontal relation with the wearer's mouth is an additional loop forming strip 21. That is, the strip 21 is secured to the band 15 by spaced fasteners 22, so that the intermediate region of the strip is spaced outward from the adjacent facing region and combines with the latter to define a loop.

Figure 6:
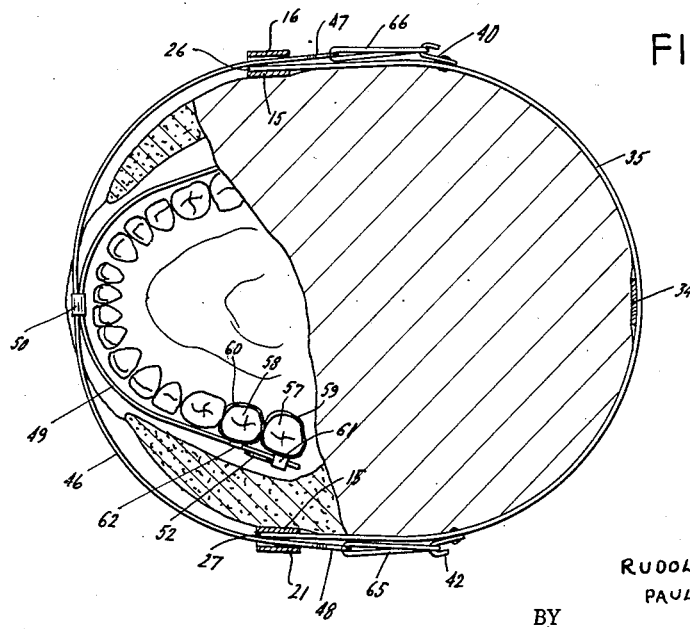
FIG. 6 is a sectional view taken substantially along the line 6—6 of FIG. 3.

A lower strap 25, advantageously fabricated of flexible plastic or the like, has its opposite end regions secured to the band 15 at spaced locations thereof, interiorly of respective loops 16 and 21. That is, the end portion 26 of strap 25 extends forwardly into the loop 16 and is there secured in facing engagement with the outer surface of the adjacent strap portion 15 by any suitable fastener element (obscured in the drawings). Similarly, the other end portion 27 of the strap 25 extends forwardly into the loop 21 and is secured in facing engagement with the adjacent outer surface portion of the strap 15 by a fastener 28. As best seen in FIGS. 3 and 6, the strap 25 extends between opposite sides of the band 15 rearward behind the wearer's head substantially level with the wearer's mouth.

An additional strap 30, also preferably fabricated of flexible plastic material, is located above the strap 25, and extends generally laterally behind the wearer's head, having its opposite end portions secured to laterally opposed portions of the band 15, as by fasteners 31 and 32 at respective locations spaced vertically above the loops 16 and 21.

Extending upward from the medial or rearwardmost region of the lower strap 25, crossing the rearmost, midpoint of the strap 30, and extending thence forward to the uppermost region of the band 15, in a generally vertical plane, is another flexible, preferably plastic strap 34. The strap 34 has its lower end region secured by a fastener 35 to the medial, rearmost region of the lower strap 25, and is secured at its crossover point to the upper strap 30 by a suitable fastener 36. The forward or upper end terminal region of the strap 34 is advantageously secured to the uppermost region of the band 15 by one element of a snap fastener 37, or other similar fastener element. In addition, the upper region of the band 15 may be provided with one or more outwardly facing snap fastener elements, or the like, as at 38 in FIG. 1.

On one side of the head gear 10 there are provided a pair of vertically spaced attachment elements or hooks 40 and 41, the former being carried by the forward region of lower strap 25 adjacent to and spaced rearward from the loop 16, while the latter is carried by the band 15 in the region between the loop 16 and upper strap fastener 31. Thus, the attachment element or hook 40 is below or lower than the attachment element or hook 41. Similarly, a vertically spaced pair of attachment elements or hooks 42 and 43, see FIG. 3, are carried on the other side of the head gear 10, the former being secured to the forward portion of lower strap 25, spaced rearward from the loop 21, and the latter being secured to the band 15 between the loop 21 and fastener 32.

Figure 2:
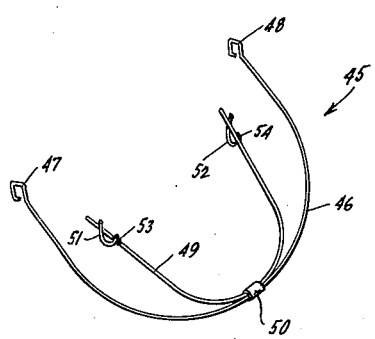
FIG. 2 is a perspective view illustrating an orthodontic device of the instant invention.

An orthodontic device is generally designated 45 in FIG. 2, and includes an elongate generally U-shaped, stiff resilient wire element 46, having hooks 47 and 48 formed on its opposite ends. A generally U-shaped yoke 49, also of stiff resilient wire, is arranged within the elongate element 46 and has its medial or bight portion firmly secured to the medial or bight portion of the elongate element by a clamp or fastener 50. The yoke 49 is considerably smaller than the wire element 46, being located symmetrically of and within the latter having its legs terminating within and short of the end loops or hooks 47 and 48 of the elongate member. Adjacent to and spaced inward from the free end of each leg of the yoke 49 is secured a resilient, J-shaped wire element, as at 51 and 52. That is, each J-shaped wire element has its shorter leg anchored fast, as by solder, at 53 and 54 to the respective yoke leg at a location spaced inward from the adjacent free yoke end. The bight portion of each wire element 51 and 52 extends from the anchored end downward and rearward toward the adjacent yoke end, with the longer leg of each wire member 51 and 52 extending thence upward and rearward across the adjacent yoke portion and terminating above the latter, spaced forward from the rear ends of the yoke.

As best seen in FIG. 6, a pair of rearward teeth 57, 58, on each side of one set of the user's teeth may be respectively provided with circumferential straps or bands 59 and 60. Secured on the outer side of the rearward band 59 is a sleeve 61, and a guide 62 is secured on the outer side of the band 60, in substantial alignment with the sleeve 61.

In the condition of use as illustrated in FIG. 3, it will be observed that the headband 15 extends snugly about the wearer's head in a generally vertical plane circumscribing the wearer's face, so as to pass beneath the chin and over the top of the head. The straps 25 and 30 extend laterally behind and in snug engagement with the wearer's head between opposite sides thereof where they are connected to the band 15; and, the strap 34 extends in a generally vertical plane in snug engagement with the wearer's head from a rearward point thereof connected to the lower strap 25, generally upward crossing the strap 30, and forward to a connection 37 with the band 15 at the upper region thereof.

The elongate wire element 46 extends generally horizontally across the wearer's face having its end hooks 47 and 48 respectively passed rearward through the loops 16 and 21 of the band 15, and there connected by resilient or elastic bands 65 and 66 to respective adjacent attachment hooks 40 and 42 secured to the strap 25. In this condition, the yoke 49 enters into the wearer's mouth with the legs of the yoke on opposite sides of the wearer's teeth. In the illustrated embodiment of FIG. 6, the yoke 49 is applied to the upper teeth of the wearer, but of course, it may also be applied to the lower teeth, as required. The free ends of the yoke 49 extend rearward through the guides 62 and sleeve 61, the resilient wire elements 51 and 52 entering partially into the sleeves and bearing resiliently against the latter. That is, the wire elements 51 and 52 are resiliently deflected by their bearing engagement in the sleeves 61 to resiliently urge the sleeves and associated teeth rearward. This applied pressure to the rear teeth removes pressure from the forward teeth and permits more proper location and disposition thereof.

In FIG. 3 it will be noted that the elongate wire element 46 extends generally horizontally rearward through the loops 16 and 21, and is there connected by the elastic members 65, which also extend generally horizontally rearward, to the attachment members 42. Thus, a generally horizontally rearward force is applied through the orthodontic appliance 45 to the rearward teeth of the user.

It may be desirable to apply pressure to the wearer's teeth in other than a generally horizontal direction, say obliquely rearward and upward. Such an arrangement is illustrated in FIG. 5, wherein the end hooks 47 and 48 of the elongate element 46 do not extend through the loops 16 and 21, but extend generally upwardly and rearwardly, terminating forward of the band 15. The end hooks 47 and 48 are resiliently connected by elastic members or bands 65 to the upper attachment members or hooks 43, to produce the desired oblique application of pressure.

An intermediate position is illustrated in FIG. 4, wherein pressure is applied in a direction between that of FIGS. 3 and 5. Here again, the end hooks 47 and 48 of the elongate element 46 extend rearward and slightly upward, terminating short of the band 15. However, the elastic members, loops, or bands 65 and 66 are each trained over, or extend about both of the adjacent vertically spaced pair of attachment members 42 and 43, and extend forward therefrom for connection to the adjacent end hook.

As illustrated in FIGS. 1 and 3, the toy elements 11 and 12 may simulate attractive missiles, or any other suitable toy devices. When the novelty of the particular toy devices no longer absorbs the wearer sufficiently to induce prolonged use of the appliance, the toy devices may be removed by a mere disengagement thereof from the snap-fastener elements 37 and 38; and, additional toy devices of novel design may be substituted therefor to produce renewed attractiveness of the orthodontic appliance.

Figure 7:
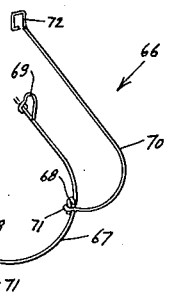
FIG. 7 is a perspective view illustrating a slightly modified orthodontic device of the present invention.

A modified orthodontic device of the present invention is illustrated in FIG. 7, and there generally designated 66. The device 66 may be substituted for the previously described device 45 of FIG. 2. The orthodontic device 66 includes a pair of elongate side members 70, fabricated of stiff resilient wire, or the like, each having a hook or loop 72 at one end, corresponding to the hooks 47 and 48 of the device of FIG. 2. The elongate members or side pieces 70 extend forward from their rear-end hooks 72, each having its forward region bent or curved laterally inward and terminating at a forward-end loop or eye 71.

A generally U-shaped yoke 67, also of stiff resilient wire, is arranged with its medial bight region forward, and provided at laterally spaced, forwardly located intermediate points with hook members 68 respectively detachably interengageable with the eyes 71 of the side pieces 70, one hook member 68 being illustrated in its attached condition, and the other in its detached relation. Adjacent to and spaced inward or forward from the free end of each leg of the yoke 67 is secured a resilient wire element 69. Each wire element 69 is of an arcuate configuration, having a forward end securely anchored to the respective yoke leg, and having its rearward end slidably engaging the adjacent portion of the yoke leg.

In use, the orthodontic device 66 may be substituted for the previously described orthodontic device 45, the yoke 67 entering the mouth of the user with its legs on opposite sides of the mouth, and the free ends of the legs engaging in the sleeves 61 with the resilient wire element 69 in resilient bearing contact with the sleeves.

From the foregoing, it is seen that the present invention provides a dental orthodontic appliance which fully accomplishes its intended objects and is well adapted to meet practical conditions of manufacture and use.

Although the present invention has been described in some detail by way of illustration and example for purposes clarity of understanding, it is understood that certain changes and modifications may be made within the spirit of the invention and scope of the appended claims.

What is claimed is:

1. A dental appliance comprising, in combination, a first strap arranged to extend substantially vertically around a wearer's head and under the chin; a second strap arranged to extend substantially horizontally around the wearer's head at substantially the elevation of the mouth, and secured at each end to said first strap; means interconnecting said straps to form a head conforming gear; a pair of first attachment elements on said first strap spaced equal and relatively short distances above the respective junctions of said first and second straps; a pair of second attachment elements on said second strap spaced equal distances rearwardly of the respective junctions of said first and second straps; an arch bar arranged to have its ends inserted into the mouth and formed with means to engage selected teeth therein; relatively elongated, substantially linear traction means secured to said arch bar and having free ends arranged to be connected to said head gear to exert traction on said arch bar; and resilient connecting elements operable to connect the free ends of said traction means selectively to either said first attachment elements, said second attachment elements, or both said first and second attachment elements; whereby, when said resilient connecting elements connect the free ends of said traction means to said first attachment elements, a pull is exerted on said arch bar in a first direction which is substantially horizontal and parallel to the rows of teeth, when said resilient connecting elements selectively connect the free ends of said traction means to said second attachment elements, the pull is exerted on said arch bar in a second direction upwardly at an angle to said first direction, and, when said resilient elements connect the free ends of said traction means to both said first and second attachment elements, a pull is exerted on said arch bar in a direction intermediate said first direction and said second direction; whereby said dental appliance is effective to exert pull in a plurality of selected directions upon the teeth engaged by said arch bar.

2. A dental appliance, as claimed in claim 1, in which said traction means comprises a wire bow connected at the midpoint of its bight to said arch bar and having hook-shaped free ends for engagement with said connecting elements.

3. A dental appliance, as claimed in claim 1, in which said traction means comprises a pair of wire elements having bent outer ends attached to points spaced equidistant from the midpoint of said arch bar, and having hooked free inner ends for attachment of said connecting elements.

4. A dental appliance, as claimed in claim 1, in which each of said attachment elements comprises a hook; said resilient connecting elements comprising endless resilient elements.

5. A dental appliance, as claimed in claim 1, including a pair of loops each extending along said first strap over a respective junction of said first and second straps; said traction elements, in said first position extending through said loops and exerting a substatnially direct rearward pull on the arch bar.

6. A dental appliance, as claimed in claim 4, in which said resilient connecting elements comprise elastic bands.

References Cited in the file of this patent

UNITED STATES PATENTS

| 664,412 | Knapp | Dec. 25, 1900 |
| 741,687 | MacDowell | Oct. 20, 1903 |
| 862,881 | Case | Aug. 13, 1907 |
| 1,990,411 | Lowry | Feb. 5, 1935 |